United States Patent Office 3,059,979
Patented Oct. 23, 1962

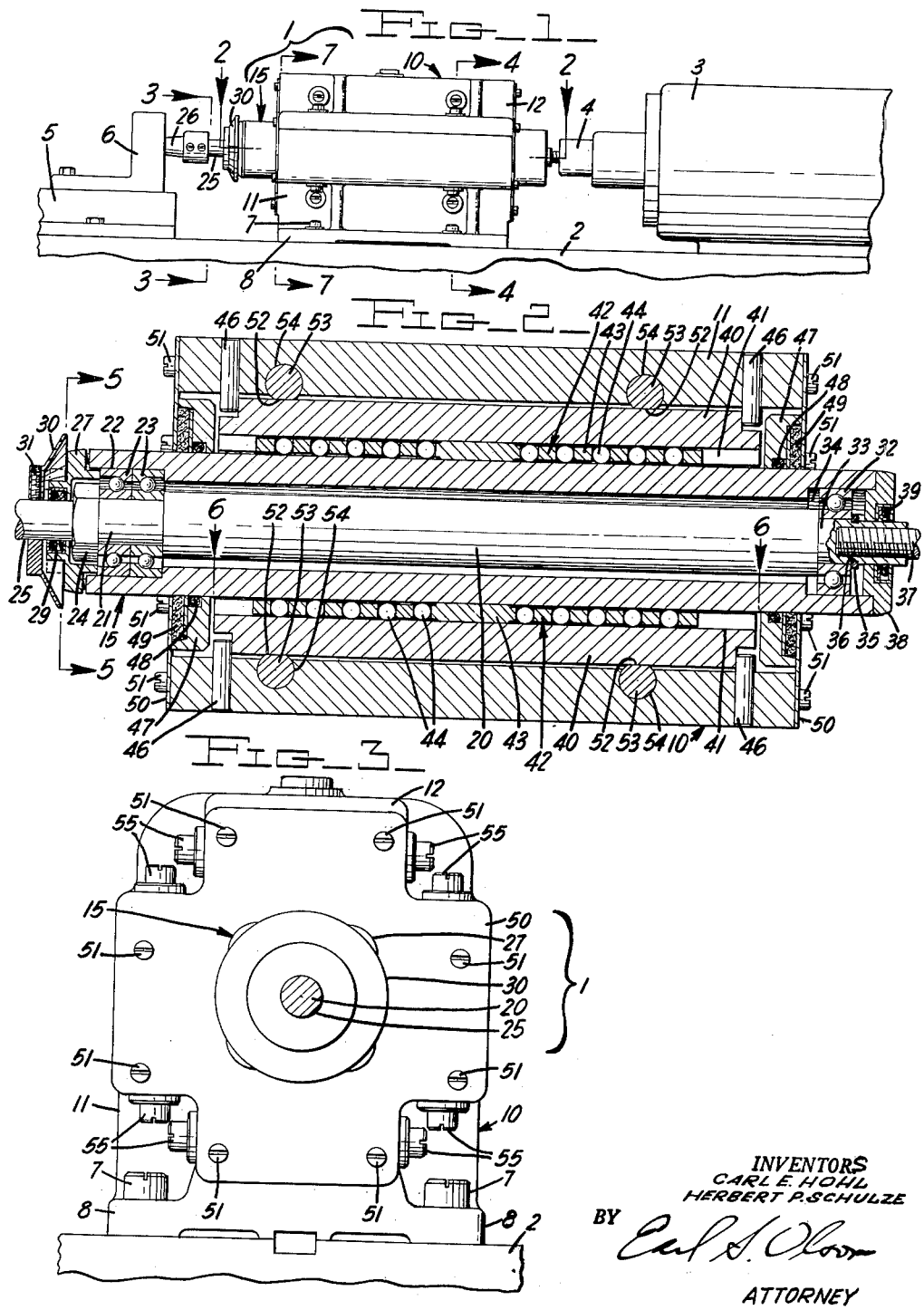

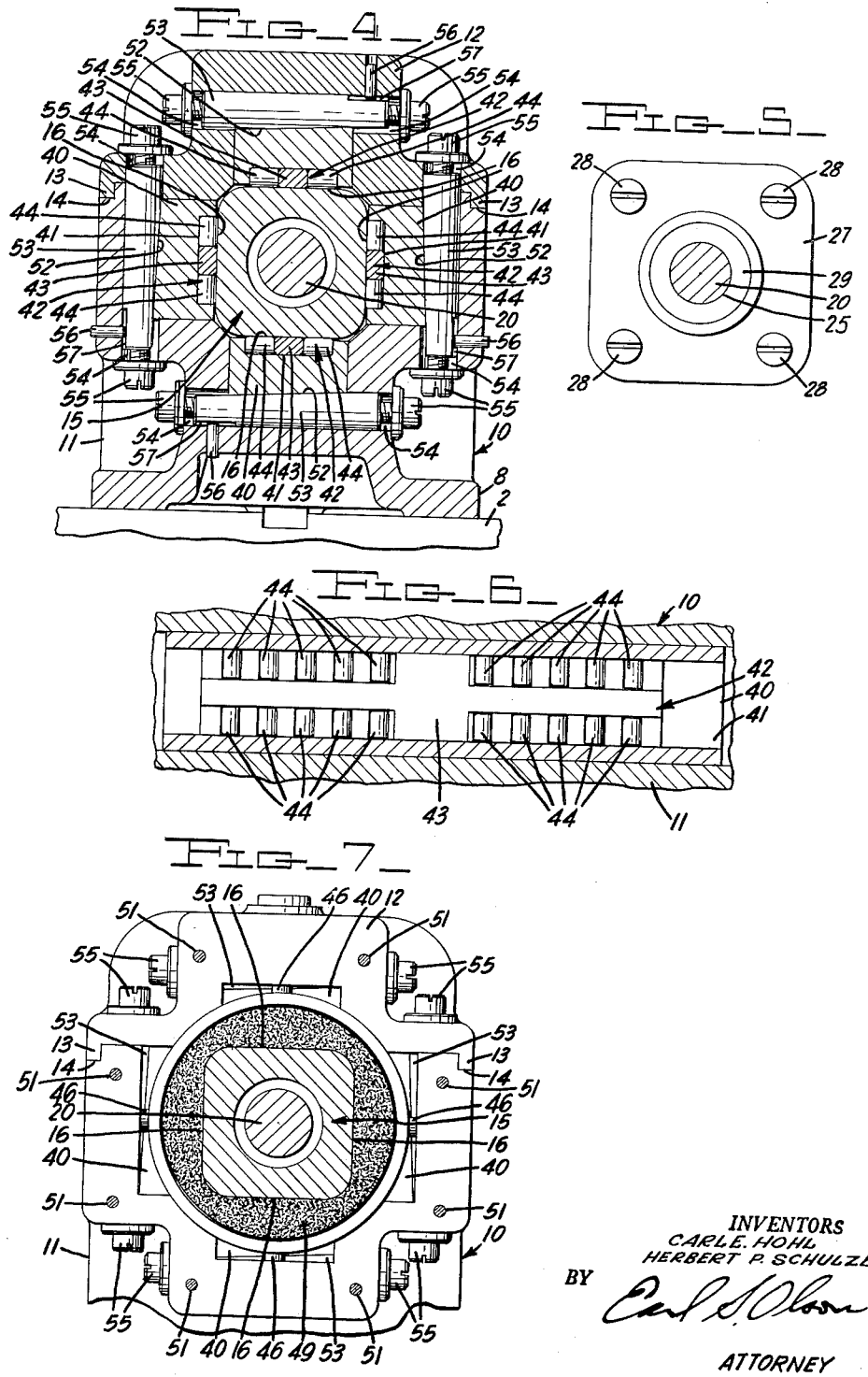

3,059,979
QUILL UNIT FOR MACHINE TOOLS
Carl E. Hohl, Wyomissing, and Herbert P. Schulze, Robesonia, Pa., assignors to Textile Machine Works, Wyomissing, Pa., a corporation of Pennsylvania
Filed Mar. 11, 1960, Ser. No. 14,325
6 Claims. (Cl. 308—6)

The instant invention relates to improvements in machine tools such as boring and drilling equipment and more particularly to an improved auxiliary device or quill unit for use therewith.

It is a common experience that many conventional drilling and boring machines as employed in ordinary machine shop practice do not have the built in accuracy, or their accuracy has been lost through wear, to permit high precision work as may be required for certain applications. Attempts have been made heretofore to add accuracy to such machines by employing, in conjunction therewith, auxiliary devices to provide a supplementary guide for the tool. However these prior devices have been either excessively cumbersome or expensive or incapable of insuring the continued accuracy required.

The principal object of the instant invention is the provision of an auxiliary device or quill unit of basically simple construction but adapted to support the quill with complete accuracy for boring or similar operations.

Another object of the invention is the provision of a unit of the type referred to including means for facile and accurate adjustment of the quill both during the original setup of the equipment and as may be required from time to time to compensate for wear of the parts.

A further object of the invention is the provision of a quill unit for cooperation with a drill head or the like, the quill unit being mounted separately from the drill head and receiving a tool supporting quill, the quill being mounted for reciprocatory movements within the unit, i.e. boring and retracting movements, as imparted to it by the spindle of the drill head.

A still further object of the invention is the provision of such quill unit comprising a housing adapted to be supported in a fixed position on the bed of the machine and a quill having opposed flats supported for reciprocatory movements within the housing, the supporting means including adjustably mounted blocks carrying antifriction bearings contacting the opposed flats of the quill.

The invention will be more fully understood and further objects and advantages thereof will become apparent when reference is made to the more detailed description which is to follow and to the accompanying drawings in which:

FIGURE 1 is an elevational view of the quill unit of the instant invention shown mounted on the bed plate and in association with a drill head of conventional type;

FIG. 2 is a sectional view on an enlarged scale taken on line 2—2 of FIG. 1 looking in the direction indicated by the arrows;

FIG. 3 is a sectional view on an enlarged scale taken on the line 3—3 of FIG. 1, looking in the direction indicated by the arrows;

FIG. 4 is a sectional view on an enlarged scale taken on the line 4—4 of FIG. 1 and looking in the direction indicated by the arrows;

FIG. 5 is a sectional view on an enlarged scale taken on the line 5—5 of FIG. 2 looking in the direction indicated by the arrows;

FIG. 6 is a detail sectional view taken on the line 6—6 of FIG. 2; and

FIG. 7 is a sectional view on an enlarged scale taken on the line 7—7 of FIG. 1.

Referring now to the drawings and particularly to FIG. 1, the quill unit 1 of the instant invention is illustrated as mounted on the bed plate 2 of a horizontal drilling or boring machine. The quill unit is shown in association with a conventional drilling or boring head 3 of any suitable type, head 3 including a spindle 4 mounted for rotary and longitudinally reciprocatory movements within the head. The setup as illustrated in FIG. 1 also includes a work holder 5 supporting the work to be bored or otherwise machined such as the part 6. Quill unit 1 is supported in fixed position on the bed as by bolts or studs 7 penetrating base flanges 8 and threaded into or otherwise secured to bed 2. It will be appreciated that while a particular setup is illustrated the invention is not to be considered as limited thereto and that the quill unit of the instant invention may be employed with equal facility with other setups such, for example, as a vertical machine.

Referring now particularly to FIGS. 2 to 7 inclusive the quill unit of the instant invention comprises a housing 10 including a base section 11 having the feet or base flanges 8, previously referred to, and which rest upon and are secured to the bed plate 2. The housing also includes a cover 12 provided with flanges 13 seated in longitudinally extending grooves 14 of the base member to accurately position the cover on the base member and the cover is suitably secured to the base by bolts (not shown).

Mounted within the housing is the quill 15. As illustrated particularly in FIGS. 4 and 7 the quill is preferably generally square in cross section and in any event is provided with flats 16 on each of its opposite sides. The quill is centrally longitudinally bored to freely receive a spindle 20 the latter including a forward portion 21 of reduced diameter lying opposite a portion 22 of increased diameter of the longitudinal bore. Portions 21 and 22 define therebetween a space in which is received antifriction bearings 23. Reduced portion 21 also includes a threaded section receiving a nut 24 serving to confine the bearings against the shoulders formed on the spindle and quill by the portions of reduced and increased diameters respectively. The spindle forward of the threaded portion receiving the nut 24 is further reduced in diameter and defines a bar or tool spindle 25 the outer end of which carries the tool or cutter as illustrated at 26 (see FIG. 1). A cap 27 surrounds nut 24 and is secured to the end of the quill by screws 28 (see FIG. 5). Cap 27 includes a recessed portion in which is mounted a lubricant seal 29 of any suitable type. Forwardly of cap 27 a dirt cap 30 is secured to the spindle as by set screw 31.

The opposite end of the spindle is also supported by an antifriction bearing 32 the bearing being mounted in a space defined by a reduced end portion 33 of the spindle and an enlarged portion 34 of the quill bore, the bearing being maintained against the shoulder defined by the spindle portion of the reduced diameter by a snap-on ring 35 received in a groove 36. Reduced end portion 33 of the spindle is threaded to receive a connector 37 integral with or otherwise secured to the spindle 4 of the head 3. A cap 38 recessed to contain a lubricant seal 39 surrounds the spindle portion 33 and is secured to the rear end of the quill by screws the same as screws 28 for securing cap 27 at the opposite end of the quill.

Housing 10 opposite each of the sides or flats 16 of the quill defines a space or recess in which is mounted similar longitudinally extending blocks 40. The face of each block adjacent quill 15 is provided with a recess or groove 41 in which is mounted a longitudinally extending freely floating antifriction bearing member 42. As illustrated particularly in FIGS. 2 and 6 bearing members 42 preferably comprise races formed as flat metal strips 43 having a series of slots extending inwardly from the opposite edges thereof each slot freely receiving a roller bearing 44 of slightly greater diameter than the thickness of the strips 43, preferably 0.002 to 0.004 inch. The blocks are held against endwise shifting by pins 46 received in bores in the housing and including ends contacting opposite ends of the blocks.

Lubricant retention means is provided at both ends of the housing comprising similar collars 47 having internal bores to relatively snugly receive the quill 15, the collars being recessed to accommodate O-rings 48 and packing washers 49 of any suitable type. The packings and collars 47 are maintained in position by cover plates 50 secured as by screws or studs 51 to the ends of the housing.

Means are provided to laterally adjust the positions of the opposed pairs of blocks to similarly adjust the position of the quill as well as to confine it between the blocks with a minimum of play whereby the spindle 20 and tool 26 may be maintained in accurate alignment with the work. For this purpose the outer surfaces of the blocks 40 are tapered as illustrated at 52 (FIG. 4). These tapered surfaces cooperate with oppositely tapered surfaces of pins 53 extending through bores 54 formed in the housing. Both ends of pins 53 are internally threaded to receive studs 55, the latter having heads of a diameter to contact the housing surrounding the bores 54. Pins 53 are maintained against rotation by pins 56 extending through perforations in the housing with their ends received in slots 57.

The quill unit of the instant invention as described above may be employed with any suitable drilling or boring head. In its use it is mounted sufficiently forward of the drilling or boring head 3 to permit the reciprocation of the spindle 4 of the latter through its forward and return movements. The spindle 4 is secured to the quill spindle 20 by the connecting element 37 as previously referred to whereby spindle 20 and its tool supporting portion 25 are both rotated and reciprocated with the spindle 4. Quill 15 on the other hand is maintained against rotation but follows the reciprocatory movements of spindle 20, the quill being in rolling contact with roller bearings 44 and the latter being in rolling contact with the flats of blocks 40.

In preparation for operation pins 53 are adjusted longitudinally through the medium of studs 55 to in turn adjust the blocks 40 until the quill is accurately positioned for free movement between the opposed blocks. Thereafter in the event of wear or other cause of play between the quill and its support which would lead to inaccuracy in operation readjustments can be readily made by further adjustments of the blocks by means of pins 53. The device of the instant invention thus provides a relatively simple auxiliary device which can be employed with a conventional drilling or boring head or similar machine to impart a high degree of accuracy to the tool supporting spindle and to maintain said accuracy throughout the entire operating stroke over long periods of operation.

Having thus described the invention in rather full detail it will be understood that these details need not be strictly adhered to and that various changes and modifications may be made without departing from the scope of the invention as defined by the following claims.

What is claimed is:

1. A quill unit for cooperation with a drilling head or the like comprising a housing adapted to be mounted in a fixed position, a quill, means for supporting said quill for longitudinal reciprocatory movements within said housing, a spindle carried by said quill for reciprocation therewith and rotation therein, means for connecting said spindle at one end thereof to said drilling head, and means adjacent an opposite end of said spindle for supporting a tool, said quill supporting means including means for laterally adjusting the position of said quill and for maintaining said adjusted position within said housing during reciprocatory movements thereof.

2. A quill unit for cooperation with a drilling head or the like comprising a housing adapted to be mounted in fixed position, a quill, means for supporting the quill for longitudinal reciprocatory movements within said housing, a spindle carried by said quill and mounted for rotation therein and reciprocation therewith, means for connecting said spindle at one end thereof to said drilling head, and means adjacent an opposite end of said spindle for supporting a tool, said quill supporting means including means for laterally adjusting and maintaining the position of said quill within said housing comprising members having cooperating tapered surfaces.

3. A quill unit for cooperation with a drilling head or the like comprising a housing adapted to be mounted in a fixed position, a quill having longitudinally extending flats thereon, a spindle mounted for rotation within said quill, and means for connecting said spindle at one end thereof to said drilling head and means adjacent an opposite end of said spindle for supporting a tool, and means adjustably supporting said quill for longitudinal reciprocatory movements within said housing, said means comprising blocks adjustably positioned within said housing, longitudinally extending bearing means between said blocks and said flats, and cooperating tapered means for adjustably positioning said blocks.

4. A quill unit for cooperation with a drilling head or the like comprising a housing adapted to be mounted in a fixed position, a quill having longitudinally extending opposed flats thereon, a spindle mounted for rotation within said quill, and means for connecting said spindle at one end thereof to said drilling head and means adjacent an opposite end of said spindle for supporting a tool, and means for adjustably supporting said quill for longitudinal reciprocatory movements within said housing, said means comprising blocks adjustably positioned within said housing, longitudinally extending antifriction bearing members between said blocks and said flats, tapered surfaces on said blocks opposite said antifriction bearing members, and means carried by said housing cooperating with said tapered surfaces for adjusting the positions of said blocks.

5. A quill unit for cooperation with a drilling head or the like comprising a housing adapted to be mounted in a fixed position, a quill having a plurality of pairs of longitudinally extending opposed flats thereon, a spindle mounted for rotation within said quill, and means for connecting said spindle at one end thereof to said drilling head and means adjacent an opposite end of said spindle for supporting a tool, and means for adjustably supporting said quill for longitudinal reciprocatory movements within said housing, said means comprising blocks adjustably positioned within said housing, longitudinally extending antifriction bearings between said blocks and said flats, tapered surfaces on said blocks opposite said antifriction bearings, and pins carried by said housing and associated with each of said blocks, each of said pins including a surface of opposite tapered to and resting against the tapered surface of its associated block, and means for longitudinally adjusting the positions of said pins.

6. A quill unit for cooperation with a drilling head or the like comprising a housing adapted to be mounted in a fixed position, a quill approximately square in cross section to define two pairs of opposed flat surfaces, a spindle mounted for rotation within said quill, and means for connecting said spindle at one end thereof to said drilling head and means adjacent an opposite end of said spindle for supporting a tool, and means for adjustably supporting said quill for longitudinal reciprocatory movements within said housing, said means comprising blocks adjustably positioned within said housing, longitudinally extending antifriction bearing members between said blocks and said flat surfaces, tapered surfaces on said blocks opposite said antifriction bearing members, and pins carried by said housing and associated with each of said blocks, each of said pins including a surface of opposite taper to and resting against the tapered surface of its associated block, and means for longitudinally adjusting the positions of said pins.

References Cited in the file of this patent

UNITED STATES PATENTS

| | | |
|---|---|---|
| 580,498 | Lewis | Apr. 13, 1897 |
| 1,682,969 | Kindervater | Sept. 4, 1928 |
| 2,387,820 | Armitage et al. | Oct. 30, 1945 |
| 2,447,424 | Nightingale | Aug. 17, 1948 |
| 2,733,691 | Johnson | Feb. 7, 1956 |